(12) United States Patent
Im et al.

(10) Patent No.: US 12,475,745 B2
(45) Date of Patent: Nov. 18, 2025

(54) DIAGNOSTIC SYSTEM OF LAUNCH VEHICLE

(71) Applicant: KOREA AEROSPACE RESEARCH INSTITUTE, Daejeon (KR)

(72) Inventors: Sunghyuck Im, Daejeon (KR); Junseong Lee, Daejeon (KR); Jaesung Park, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 145 days.

(21) Appl. No.: 18/505,491

(22) Filed: Nov. 9, 2023

(65) Prior Publication Data

US 2024/0177539 A1 May 30, 2024

(30) Foreign Application Priority Data

Nov. 25, 2022 (KR) .................. 10-2022-0160267

(51) Int. Cl.
*G07C 5/08* (2006.01)
(52) U.S. Cl.
CPC ................. *G07C 5/0808* (2013.01)
(58) Field of Classification Search
CPC ...... G07C 5/0808; G01B 11/24; G01B 11/03; G01B 11/165; G01B 2210/58
See application file for complete search history.

(56) References Cited

U.S. PATENT DOCUMENTS

| | | | |
|---|---|---|---|
| 6,424,411 B1 | 7/2002 | Rapidel et al. | |
| 10,488,183 B1 | 11/2019 | Wolf et al. | |
| 12,223,594 B2 * | 2/2025 | Coffman | G06T 15/04 |

FOREIGN PATENT DOCUMENTS

| | | |
|---|---|---|
| CN | 110906880 A | 3/2020 |
| CN | 112833786 A | 5/2021 |
| CN | 115061148 A | 9/2022 |
| JP | H05105198 A | 4/1993 |
| JP | H05322534 A | 12/1993 |
| JP | 6830557 B1 | 2/2021 |
| KR | 101460505 B1 | 11/2014 |

* cited by examiner

*Primary Examiner* — Michael V Kerrigan
(74) *Attorney, Agent, or Firm* — McCoy Russell LLP

(57) ABSTRACT

The present disclosure relates to a diagnostic system of a launch vehicle, and more particularly, to a technology capable of accurately estimating a change in attitude and volume of the launch vehicle by generating a three-dimensional shape of the launch vehicle and comparing the three-dimensional shape with reference shape information using a light detection and ranging (LIDAR) sensor to calculate state information of the launch vehicle.

5 Claims, 7 Drawing Sheets

DIAGNOSTIC SYSTEM OF LAUNCH VEHICLE

CROSS-REFERENCE TO RELATED APPLICATION

This application claims priority under 35 U.S.C. § 119 to Korean Patent Application No. 10-2022-0160267, filed on Nov. 25, 2022, in the Korean Intellectual Property Office, the disclosure of which is incorporated herein by reference in its entirety.

TECHNICAL FIELD

The following disclosure relates to a diagnostic system of a launch vehicle, and more particularly, to a diagnostic system of a launch vehicle that compares a three-dimensional shape generated based on a LIDAR sensor with the existing shape information of the launch vehicle to diagnose a state of the launch vehicle.

BACKGROUND

A launch vehicle is a rocket device used to lift a payload into Earth's orbit or transport the payload from the Earth's surface into outer space, escaping the Earth's gravitational field. In order to safely enter the launch vehicle into the orbit, not only an optimized flight trajectory design of the launch vehicle, but also attitude alignment of the launch vehicle are essentially required.

Here, the attitude alignment of the launch vehicle means controlling errors in a structure that occur due to the change in the attitude and volume of the launch vehicle standing on a launch pad before the launch vehicle is launched.

Therefore, the attitude alignment of the launch vehicle is necessary to stably fly to a target point without escaping from the orbit, and the importance of a system and a device for accurately aligning an attitude is increasing.

Accordingly, in order to perform accurate initial attitude alignment of the launch vehicle, sensors are arranged on or around the launch vehicle to measure the attitude of the launch vehicle, thereby performing the initial attitude alignment.

In detail, the attitude alignment of the launch vehicle is performed by transmitting an optical alignment laser to an inertial sensor unit mounted on the launch vehicle using optical alignment equipment installed at a launch site.

However, in the case of the existing attitude alignment method, for the optical alignment, it is necessary to install a separate optical window that transmits part of a transmitted beam and reflects the other part toward the launch vehicle, and when charging and discharging launch vehicle fuel, a change occurs in the launch vehicle structure, which is mostly composed of a tank, so there is a problem that it is not easy to detect the deformation of the structure with only sensors installed on the launch vehicle.

SUMMARY

An embodiment of the present disclosure is directed to providing a diagnostic system of a launch vehicle capable of accurately estimating a change in attitude and volume of the launch vehicle by generating a three-dimensional shape of the launch vehicle and comparing the three-dimensional shape with reference shape information using a light detection and ranging (LIDAR) sensor to calculate state information of the launch vehicle, unlike the conventional attitude measurement and diagnostic system of a launch vehicle.

In one general aspect, a diagnostic system of a launch vehicle includes: a sensor unit 100 that includes at least one sensor 110 installed toward an appearance of a launch vehicle 10; moving means 200 that moves the sensor unit 100 in a longitudinal direction of the launch vehicle 10; and a signal processing unit 300 that controls the moving means 200, receives sensing information from the sensor unit 100, and provides state information of the launch vehicle 10, in which the sensor 110 includes LIDAR, and the signal processing unit 300 calculates the state information of the launch vehicle 10 based on location information of the sensor unit 100 moved by the moving means 200, sensing information received from the sensor unit 100, and reference shape information 30 of the launch vehicle 10.

The signal processing unit 300 may control the moving means 200 to vary a location of the sensor unit 100, and generate a three-dimensional shape 40 of the launch vehicle 10 based on the varying location information of the sensor unit 100 and the sensing information received from the sensor unit 100 at the corresponding location.

The signal processing unit 300 may generate a plurality of detection points 41 based on the location information of the sensor unit 100 and the sensing information, and connect the plurality of detection points 41 to generate the three-dimensional shape 40 of the launch vehicle 10.

The signal processing unit 300 may compare the three-dimensional shape 40 of the launch vehicle 10 with reference shape information 30 of the launch vehicle 10 to calculate state information of the launch vehicle 10.

The signal processing unit 300 may generate a plurality of virtual points 31 corresponding to the reference shape information 30 of the launch vehicle 10.

The signal processing unit 300 may set a reference axis 50 based on the launch vehicle 10 and calculate first coordinate values corresponding to the plurality of virtual points 31, and calculate second coordinate values corresponding to a plurality of detection points 41 generated based on the location information of the sensor unit 100 and the sensing information.

The signal processing unit 300 may calculate a difference between the first coordinate value and the second coordinate value to calculate the state information of the launch vehicle 10.

In another general aspect, a diagnostic system of a launch vehicle includes: a structure 20 that is formed parallel to the launch vehicle 10 in a longitudinal direction of the launch vehicle 10; a sensor unit 100 that includes at least one sensor 110 installed on the structure 20 toward an appearance of the launch vehicle 10; and a signal processing unit 300 that controls the sensor unit 100, receives sensing information from the sensor unit 100, and provides state information of the launch vehicle 10, in which the sensor 110 includes LIDAR, and the signal processing unit 300 calculates the state information of the launch vehicle 10 based on location information of the sensor unit 100 installed on the structure 20, sensing information received from the sensor unit 100, and reference shape information 30 of the launch vehicle 10.

The signal processing unit 300 may generate a three-dimensional shape 40 of the launch vehicle 10 based on the location information of the sensor unit 100 and the sensing information received from the sensor unit 100 at the corresponding location.

The signal processing unit 300 may generate a plurality of detection points 41 based on the location information of the sensor unit 100 and the sensing information, and connect the plurality of detection points 41 to generate the three-dimensional shape 40 of the launch vehicle 10.

The signal processing unit 300 may compare the three-dimensional shape 40 of the launch vehicle 10 with reference shape information 30 of the launch vehicle 10 to calculate state information of the launch vehicle 10.

The signal processing unit 300 may generate a plurality of virtual points 31 corresponding to the reference shape information 30 of the launch vehicle 10.

The signal processing unit 300 may set a reference axis 50 based on the launch vehicle 10 and calculate first coordinate values corresponding to the plurality of virtual points 31, and calculate second coordinate values corresponding to a plurality of detection points 41 generated based on the location information of the sensor unit 100 and the sensing information.

The signal processing unit 300 may calculate a difference between the first coordinate value and the second coordinate value to calculate the state information of the launch vehicle 10.

DETAILED DESCRIPTION OF EMBODIMENTS

Figure 1:
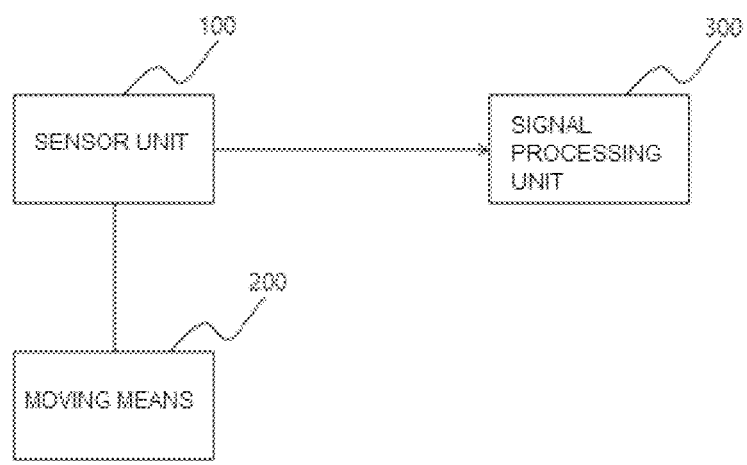
FIG. 1 is a diagram schematically illustrating a diagnostic system of a launch vehicle according to an embodiment of the present disclosure.

Hereinafter, a diagnostic system of a launch vehicle of the present disclosure will be described in detail with reference to the attached drawings. The drawings introduced below are provided to facilitate a sufficient understanding of the present disclosure, but are not limited thereto and may be embodied in other forms. In addition, like reference numerals denote like elements throughout the specification.

Technical terms and scientific terms used in the present specification have the general meaning understood by those skilled in the art to which the present disclosure pertains unless otherwise defined, and a description for the known function and configuration unnecessarily obscuring the gist of the present disclosure will be omitted in the following description and the accompanying drawings.

Figure 2:
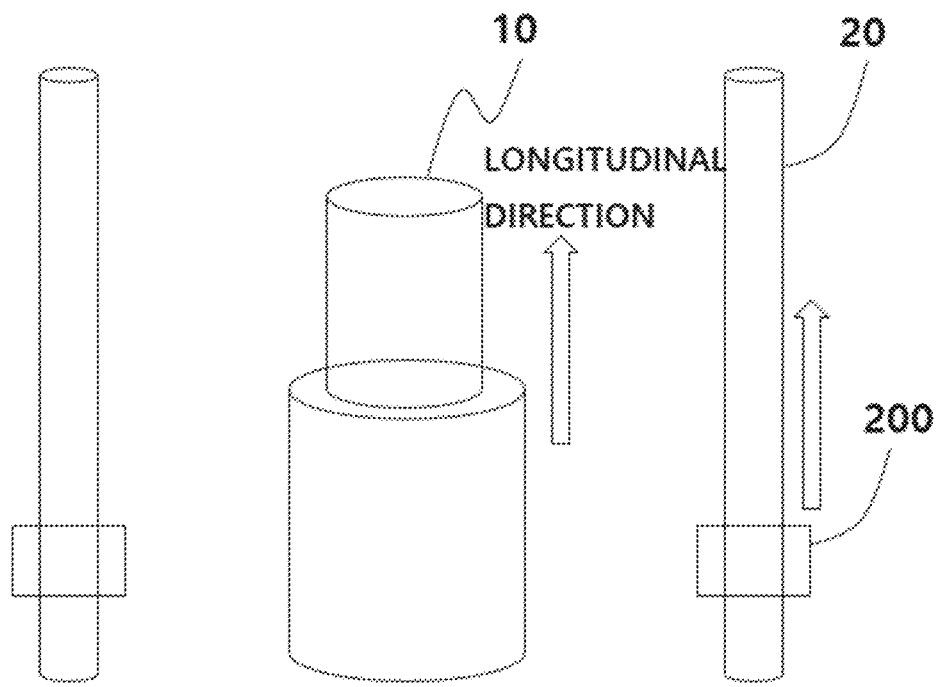
FIG. 2 is a diagram schematically illustrating moving means included in the diagnostic system of a launch vehicle according to the embodiment of the present disclosure.

FIG. 1 is a diagram schematically illustrating a diagnostic system of a launch vehicle according to an embodiment of the present disclosure, and FIG. 2 is a diagram schematically illustrating moving means included in the diagnostic system of a launch vehicle according to the embodiment of the present disclosure.

As illustrated in FIG. 1, a diagnostic system of a launch vehicle according to an embodiment of the present disclosure includes a sensor unit 100, a moving means 200, and a signal processing unit 300.

The sensor unit 100 may include at least one sensor 110 that is installed toward an appearance of a launch vehicle 10 and senses the appearance of the launch vehicle 10. In this case, the sensor 110 is light detection and ranging (LIDAR) and may collect sensing information of the launch vehicle 10 by shooting a laser at the launch vehicle 10 and measuring the return time.

Referring to FIG. 2, as illustrated in FIG. 2, the moving means 200 may move linearly along a longitudinal direction of the launch vehicle 10. Here, the moving means 200 may be installed and moved in a structure 20 formed around the launch vehicle 10, but is not limited thereto and may be installed in various locations if necessary. In addition, by being combined with the sensor unit 100, the sensor unit 100 may sense the overall appearance of the launch vehicle 10 while linearly moving along the longitudinal direction of the launch vehicle 10.

The signal processing unit 300 may control the moving means 200 and receive sensing information from the sensor unit 100 to provide state information of the launch vehicle 10. In detail, the signal processing unit 300 may control the moving means 200 to vary the location of the sensor unit 100, and may thus generate a three-dimensional shape 40 of the launch vehicle 10 through the collected location information of the sensor unit 100 coupled with the moving means 200 and the sensing information received from the sensor unit 100 at the location.

Figure 3:
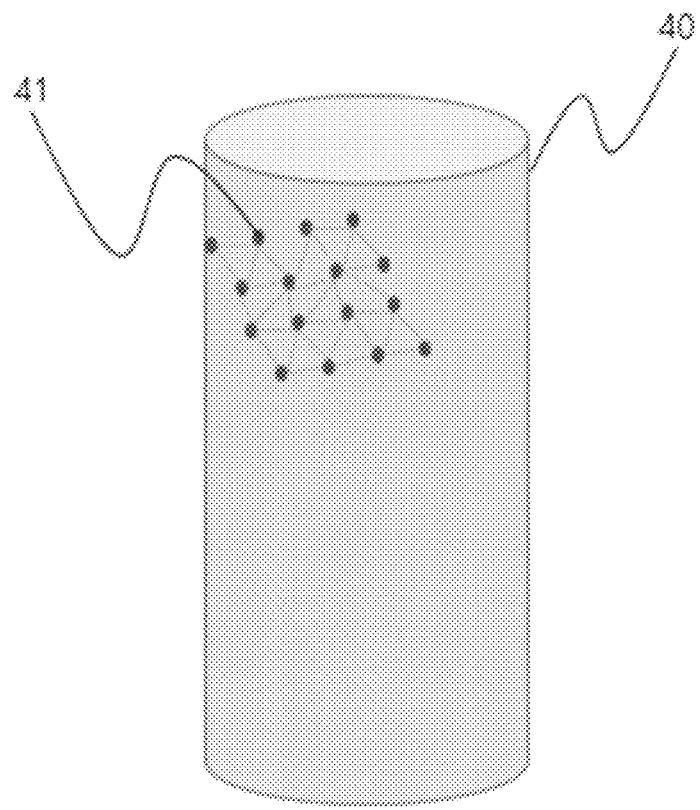
FIG. 3 is a diagram schematically illustrating a three-dimensional shape of the launch vehicle generated by the diagnostic system of a launch vehicle according to the embodiment of the present disclosure.
Figure 4:
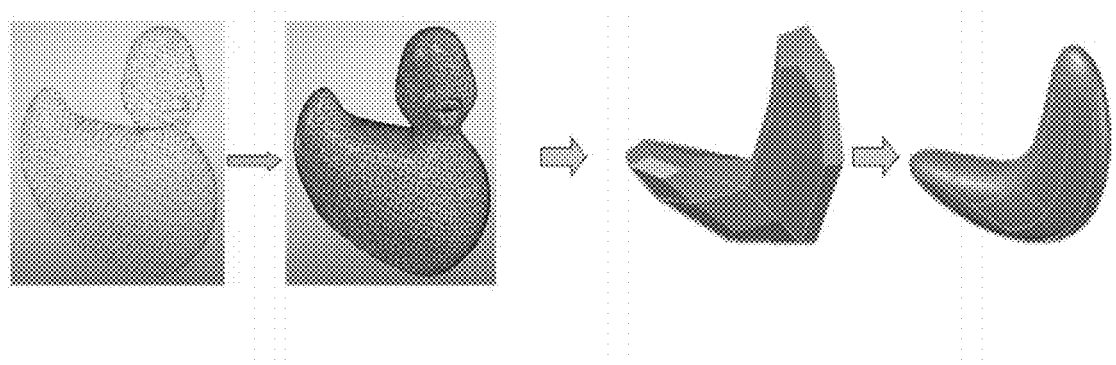
FIG. 4 is a diagram schematically illustrating an example of an overall shape of an object generated by a LIDAR sensor of the diagnostic system of a launch vehicle according to the embodiment of the present disclosure.

FIG. 3 schematically illustrates the three-dimensional shape of the launch vehicle generated by the diagnostic system of a launch vehicle according to an embodiment of the present disclosure, and FIG. 4 is a diagram schematically illustrating an example of a three-dimensional shape of an object generated by a LIDAR sensor of the diagnostic system of a launch vehicle according to the embodiment of the present disclosure.

Referring to FIG. 3, the signal processing unit 300 may generate a plurality of detection points 41 based on the location information and the sensing information of the sensor unit 100. Here, the detection point 41 is a point cloud, and the surface of the launch vehicle 10 may be represented as a plurality of point sets defined by a three-dimensional coordinate system x, y, and z, which will be described later in detail. In addition, the three-dimensional shape 40 of the launch vehicle 10 may be generated by connecting the plurality of detection points 41 to each other.

Referring to FIG. 4, the present disclosure may sense an object using the LIDAR sensor of the sensor unit 100 and generate the plurality of detection points 41 corresponding to the object. In addition, the three-dimensional shape 40 of the object may be generated by connecting the plurality of detection points 41 to each other. In this case, since the sensor unit 100 senses the entire appearance shape of the object, the sensor unit 100 may accurately represent an external shape of the object, making it possible to estimate the change in the appearance shape of the object. In addition, solid modeling may be applied to the three-dimensional shape 40 of the object connecting between the plurality of detection points 41 to restore the overall shape of the object. Here, the protruding structure of the object may be selected as a feature point based on the solid model of the object generated through the solid modeling, and the change in rotation of the vertical axis of the object may be estimated based on the feature point. Therefore, it is possible to accurately estimate not only the change in the external shape of the object but also the change in rotation of the vertical axis.

Figure 5:
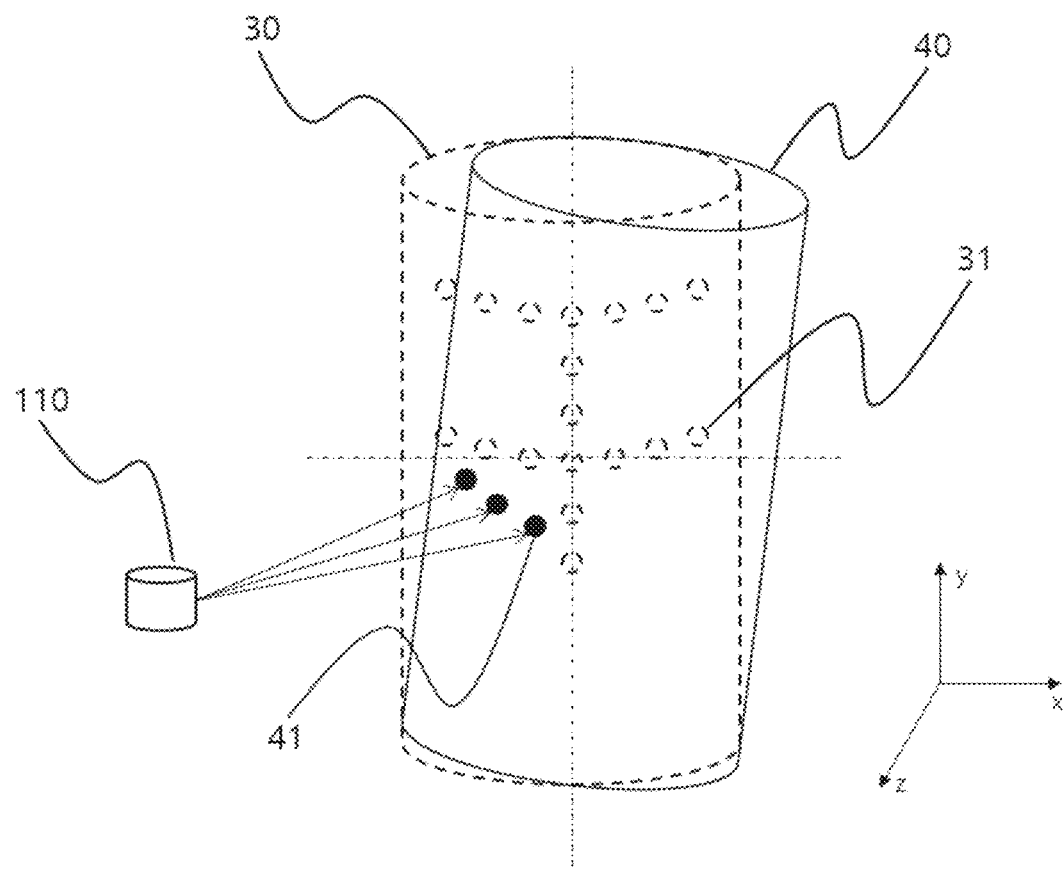
FIG. 5 is a diagram schematically illustrating a structure for calculating state information of the launch vehicle in the diagnostic system of a launch vehicle according to the embodiment of the present disclosure.

FIG. 5 is a diagram schematically illustrating a structure for calculating state information of the launch vehicle in the diagnostic system of a launch vehicle according to the embodiment of the present disclosure.

Referring to FIG. 5, the signal processing unit 300 may compare the three-dimensional shape 40 of the launch vehicle 10 with reference shape information 30 of the launch vehicle 10 to calculate the state information of the launch vehicle 10. Here, the reference shape information 30 may represent the existing external shape of the launch vehicle 10 in the three-dimensional shape by a computing device, and may be stored or input in advance to the signal processing unit 300. In addition, the state information may include the change in the external shape of the launch vehicle 10, such as attitude, bending degree, and swelling of the launch vehicle 10, and ice generated on the launch vehicle 10.

Figure 6:
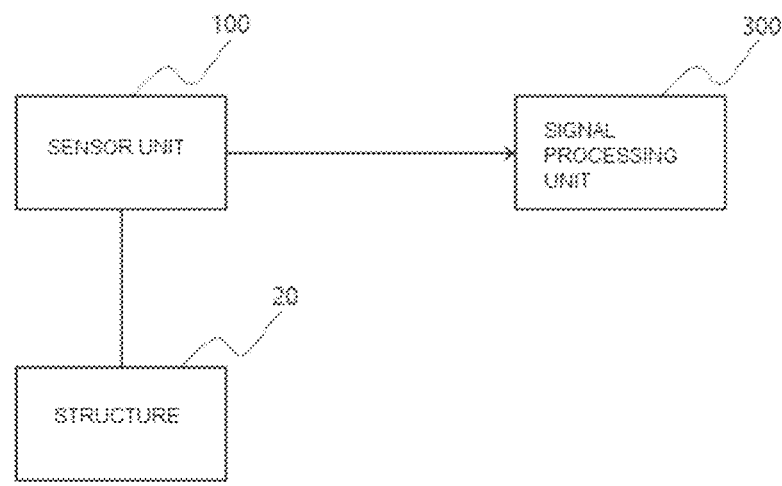
FIG. 6 is a diagram schematically illustrating a diagnostic system of a launch vehicle according to another embodiment of the present disclosure.
Figure 7:
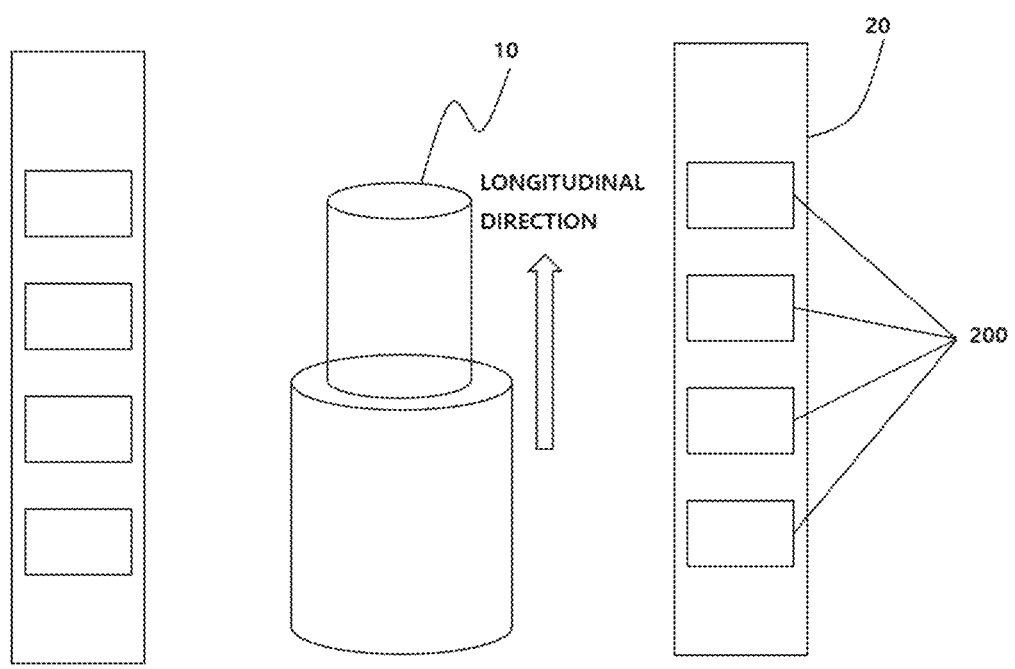
FIG. 7 is a diagram schematically illustrating a plurality of sensor units included in the diagnostic system of a launch vehicle according to another embodiment of the present disclosure.

FIG. 6 is a diagram schematically illustrating a diagnostic system of a launch vehicle according to another embodiment of the present disclosure, and FIG. 7 is a diagram schematically illustrating a plurality of sensor units included in the diagnostic system of a launch vehicle according to another embodiment of the present disclosure.

As illustrated in FIG. 6, a diagnostic system of a launch vehicle according to another embodiment of the present disclosure includes a structure 20, a sensor unit 100, and a signal processing unit 300.

The structure 20 may be formed parallel to the longitudinal direction of the launch vehicle 10, but is not limited thereto and may be configured in various shapes if necessary.

The sensor unit 100 may include at least one sensor 110 that is installed toward an appearance of a launch vehicle 10 and senses the appearance of the launch vehicle 10. In this case, the sensor 110 is light detection and ranging (LIDAR) and may collect sensing information of the launch vehicle 10 by shooting a laser at the launch vehicle 10 and measuring the return time.

Referring to FIG. 7, the sensor unit 100 may be installed on the structure 20 along the longitudinal direction of the launch vehicle 10. Here, the structure 20 may include the plurality of sensor units 100, and the sensor unit 100 sense each of the external shapes of the launch vehicle 10 according to the location installed in the structure 20 to sense the overall appearance of the launch vehicle, and is not limited thereto, and may be installed in various locations if necessary.

The signal processing unit 300 may control the sensor unit 100, receive the sensing information from the sensor unit 100, and provide the state information of the launch vehicle 10. In detail, the signal processing unit 300 may control each of the sensor units 100 installed on the structure 20, and may thus generate the three-dimensional shape 40 of the launch vehicle 10 through the collected location information of the sensor unit 100 and the sensing information received from the sensor unit 100 at the location.

Referring to FIG. 3, the signal processing unit 300 may generate a plurality of detection points 41 based on the location information and the sensing information of the sensor unit 100. Here, the detection point 41 is the point cloud, and the surface of the launch vehicle 10 may be represented as the plurality of point sets defined by the three-dimensional coordinate system x, y, and z. In addition, the three-dimensional shape 40 of the launch vehicle 10 may be generated by connecting the plurality of detection points 41 to each other.

Referring to FIG. 5, the signal processing unit 300 may compare the three-dimensional shape 40 of the launch vehicle 10 with reference shape information 30 of the launch vehicle 10 to calculate the state information of the launch vehicle 10. Here, the reference shape information 30 may represent the existing external shape of the launch vehicle 10 in the three-dimensional shape by a computing device, and may be stored or input in advance to the signal processing unit 300. In addition, the state information may include the change in the external shape of the launch vehicle 10, such as the attitude, the bending degree, and the swelling of the launch vehicle 10, and ice generated on the launch vehicle 10.

Describing in detail the method of calculating the state information of the launch vehicle 10 of the diagnostic system of a launch vehicle according to embodiments of the present disclosure, the signal processing unit 300 may generate a plurality of virtual points 31 corresponding to the reference shape information 30 of the launch vehicle 10. In this case, the virtual point 31 may represent the surface of the existing external appearance of the launch vehicle 10 as a set of multiple points defined by the three-dimensional coordinate system x, y, and z.

In addition, the signal processing unit 300 may set a reference axis 50 based on the launch vehicle 10 and calculate first coordinate values corresponding to the plurality of virtual points 31, and calculate second coordinate values corresponding to a plurality of detection points 41 generated based on the location information of the sensor unit 100 and the sensing information. In detail, using a center of the reference axis 50 set in the launch vehicle 10 as a zero point, first coordinate values x, y, and z corresponding to the plurality of virtual points 31 may be calculated, and second coordinate values x', y', and z' corresponding to the plurality of detection points (41) corresponding to the plurality of virtual points 31 may be calculated. In this case, the virtual point 31 may arbitrarily set the plurality of point sets.

In addition, the signal processing unit 300 may calculate a difference between the first coordinate value and the second coordinate value to calculate the state information of the launch vehicle 10. In detail, a difference x-x', y-y', and z-z' between the first coordinate values x, y, and z corresponding to the plurality of virtual points 31 and the second coordinate values x', y', and z' corresponding to the plurality of detection points may be obtained. In this case, the state information of the launch vehicle 10 may be calculated according to the difference between the first coordinate value and the second coordinate value.

In other words, when the difference between the first coordinate value and the second coordinate value is 0, it may mean that there is no abnormality in the state of the launch vehicle 10 corresponding to the second coordinate value, and when there is a difference between the first coordinate value and the second coordinate value, it may mean that there is an abnormality in the state of the launch vehicle 10 corresponding to the second coordinate value. As a result, it is possible to estimate the attitude of the launch vehicle 10, estimate the changes such as the bending degree and the swelling of the launch vehicle 10 to detect whether there is an abnormality, and detect ice generated on the launch vehicle 10 when charging the cryogenic propellant.

As described above, according to the diagnostic system of a launch vehicle according to embodiments of the present disclosure, it is possible to generate the three-dimensional shape of the launch vehicle using the LIDAR sensor, compare the three-dimensional shape with the reference shape information to calculate the state information of the launch vehicle, and accurately estimate the change in the launch vehicle.

According to an diagnostic system of a launch vehicle of the present disclosure having the above configuration, it is possible to accurately estimate a change in the launch vehicle by comparing a three-dimensional shape of the launch vehicle and reference shape information, detect whether there are abnormalities such as swelling and bending of a launch vehicle structure when charging and discharging fuel of the launch vehicle, and detect ice generated on the launch vehicle when charging cryogenic propellant using reflectivity data of LIDAR.

Although the present disclosure has been described with limited embodiments and drawings, the present disclosure is not limited to the above embodiments, and those skilled in the art can make various modifications and variations to the present disclosure without departing from the spirit and scope of the appended claims.

What is claimed is:

1. A diagnostic system of a launch vehicle, comprising:
    a sensor unit that includes at least one sensor installed toward an appearance of the launch vehicle;
    moving means that moves the sensor unit in a longitudinal direction of the launch vehicle; and
    a signal processing unit that controls the moving means, receives sensing information from the sensor unit, and provides state information of the launch vehicle,
    wherein the at least one sensor includes a Light Detection and Ranging (LIDAR) sensor, and
    the signal processing unit generates a three-dimensional shape of the launch vehicle based on location information of the sensor unit moved by the moving means, and sensing information received from the sensor unit,
    wherein the signal processing unit compares the three-dimensional shape of the launch vehicle with reference shape information of the launch vehicle to calculate state information of the launch vehicle by setting a reference axis based on the launch vehicle,
    generating a plurality of virtual points corresponding to the reference shape information of the launch vehicle,
    calculating first coordinate values corresponding to the plurality of virtual points based on the reference axis, calculating second coordinate values corresponding to a plurality of detection points generated based on the location information of the sensor unit and the sensing information, and calculating a difference between the first coordinate values and the second coordinate values to calculate the state information of the launch vehicle.

2. The diagnostic system of claim 1, wherein the signal processing unit controls the moving means to vary a location of the sensor unit.

3. The diagnostic system of claim 2, wherein the signal processing unit generates a plurality of detection points based on the location information of the sensor unit and the sensing information, and
    connects the plurality of detection points to generate the three-dimensional shape of the launch vehicle.

4. A diagnostic system of a launch vehicle, comprising:
    a structure that is formed parallel to the launch vehicle in a longitudinal direction of the launch vehicle;
    a sensor unit that includes at least one sensor installed on the structure toward an appearance of the launch vehicle; and
    a signal processing unit that controls the sensor unit, receives sensing information from the sensor unit, and provides state information of the launch vehicle,
    wherein the at least one sensor includes a Light Detection and Ranging (LIDAR) sensor, and
    the signal processing unit generates a three-dimensional shape of the launch vehicle based on location information of the sensor unit installed on the structure and sensing information received from the sensor unit,
    wherein the signal processing unit compares the three-dimensional shape of the launch vehicle with reference shape information of the launch vehicle to calculate state information of the launch vehicle by setting a reference axis based on the launch vehicle,
    generating a plurality of virtual points corresponding to the reference shape information of the launch vehicle,
    calculating first coordinate values corresponding to the plurality of virtual points based on the reference axis, calculating second coordinate values corresponding to a plurality of detection points generated based on the location information of the sensor unit and the sensing information, and calculating a difference between the first coordinate values and the second coordinate values to calculate the state information of the launch vehicle.

5. The diagnostic system of claim 4, wherein the signal processing unit generates a plurality of detection points based on the location information of the sensor unit and the sensing information, and
    connects the plurality of detection points to generate the three-dimensional shape of the launch vehicle.

* * * * *